(12) United States Patent
Reid et al.

(10) Patent No.: US 8,121,980 B2
(45) Date of Patent: Feb. 21, 2012

(54) TRANSACTIONAL RECORD MANAGER

(75) Inventors: Colin Wilson Reid, Redmond, WA (US); Philip A. Bernstein, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 534 days.

(21) Appl. No.: 12/370,603

(22) Filed: Feb. 13, 2009

(65) Prior Publication Data

US 2010/0211554 A1 Aug. 19, 2010

(51) Int. Cl.
*G06F 17/30* (2006.01)
(52) U.S. Cl. .................. 707/648; 707/636
(58) Field of Classification Search .......... 707/636, 707/648
See application file for complete search history.

(56) References Cited

U.S. PATENT DOCUMENTS

| | | | |
|---|---|---|---|
| 5,263,155 A | 11/1993 | Wang | |
| 6,240,413 B1 | 5/2001 | Learmont | |
| 6,353,828 B1 | 3/2002 | Ganesh et al. | |
| 6,681,226 B2 | 1/2004 | Bretl et al. | |
| 7,103,597 B2 | 9/2006 | McGoveran | |
| 7,434,010 B2 | 10/2008 | Duffy et al. | |
| 7,801,866 B1 * | 9/2010 | Kathuria et al. | 707/682 |
| 2002/0091717 A1 * | 7/2002 | Shi et al. | 707/201 |
| 2002/0116457 A1 * | 8/2002 | Eshleman et al. | 709/203 |
| 2002/0138483 A1 | 9/2002 | Bretl et al. | |
| 2007/0198518 A1 | 8/2007 | Luchangco et al. | |
| 2008/0120297 A1 | 5/2008 | Kapoor et al. | |
| 2009/0125563 A1 * | 5/2009 | Wong et al. | 707/200 |
| 2010/0198914 A1 * | 8/2010 | Gehrke et al. | 709/203 |

OTHER PUBLICATIONS

Robinson, John T., "Design of Concurrency Controls for Transaction Processing Systems", retrieved at <<http://oai.dtic.mil/oai/oai?&verb=getRecord&metadataPrefix=html&identifier=ADA121515>>, Apr. 2, 1982, p. 1.
Kung, et al., "On Optimistic Methods for Concurrency Control", retrieved at <<http://www.seas.upenn.edu/~zives/cis650/papers/opt-cc.pdf>>, ACM Transactions on Database Systems, vol. 6, No. 2, Jun. 1981, pp. 213-226.
"Optimistic Concurrency Control", retrieved at <<http://www.cs.unc.edu/~dewan/242/s99/notes/trans/node7.html>>, Nov. 6, 2008, p. 1.
Huang, et al., "Concurrency Control Protocol for Broadcast-based Transaction Processing and Correctness Proof", retrieved at <<http://citeseerx.ist.psu.edu/viewdoc/download;jsessionid=68E3E6673C3AFB552399DEB2E4E91434?doi=10.1.1.13.4000&rep=rep1&type=pdf>>, pp. 6, 2001.

* cited by examiner

*Primary Examiner* — Khanh Pham
(74) *Attorney, Agent, or Firm* — Zete Law, P.L.L.C.; MacLane C. Key

(57) ABSTRACT

Transactional record management methods and systems enabling multiple independent servers (such as database servers) using shared storage to initiate transactions in parallel without inter server communication and without locking the records used by the transaction. The in-flight transactions can be included in a shared transaction log without a final determination of whether the transaction committed. The log updates can be broadcast to each of the servers, which each parse the log, using the same rules of analysis, and therefore each compute server can independently and asynchronously come to the same conclusion as to which transactions aborted and which transactions committed.

20 Claims, 10 Drawing Sheets

TRANSACTIONAL RECORD MANAGER

TECHNICAL FIELD

This description relates generally to transactional record management systems, and more particularly to management of databases that are concurrently accessed and updated by multiple entities.

BACKGROUND

Transactional record management systems provide many benefits, such as "ACID" (Atomic, Consistent, Isolated, and Durable) transactional support for multiple concurrent servers.

However, there is a challenge to increase transaction throughput and scalability.

SUMMARY

The following presents a simplified summary of the disclosure in order to provide a basic understanding to the reader. This summary is not an extensive overview of the disclosure and it does not identify key or critical elements of the invention or delineate the scope of the invention. Its sole purpose is to present some concepts disclosed herein in a simplified form as a prelude to the more detailed description that is presented later.

In accordance with one implementation described in relation to databases, a compute server initiates a transaction, sends a transaction record to a log manager without determining that the transaction will commit, and the log manager creates a log record in the transaction log corresponding to the transaction record without determining that the transaction will commit. The compute server then determines that the transaction log contains a log record corresponding to the transaction and can then determine if the transaction committed. In this manner, multiple compute clients can simultaneously be updating records in a shared database.

The determination whether a given log record committed is made based on the log record and on the transaction's relationship with other transactions recorded in the transaction log, based on the isolation level associated with the transaction(s). Thus each compute server that accesses the shared database independently and asynchronously determines for itself whether the transaction committed, without performing any additional communication or synchronization with other compute servers.

In an embodiment the database includes a shared storage or "log-structured storage" that is treated as a sequential device, where new data is added to the end of a populated region of storage. The term "log-structured storage" indicates that the storage is treated as if it were a sequential log of pages. The shared storage can include storage which allows write operations to unspecified locations in the storage, and after the writing completes successfully, returns the location (e.g., logical block address and/or network address) where the data was written.

Additional features and advantages are described in the following detailed description and accompanying drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DESCRIPTION OF THE DRAWINGS

Like reference numerals are used to designate like parts in the accompanying drawings.

DETAILED DESCRIPTION

Figure 1:
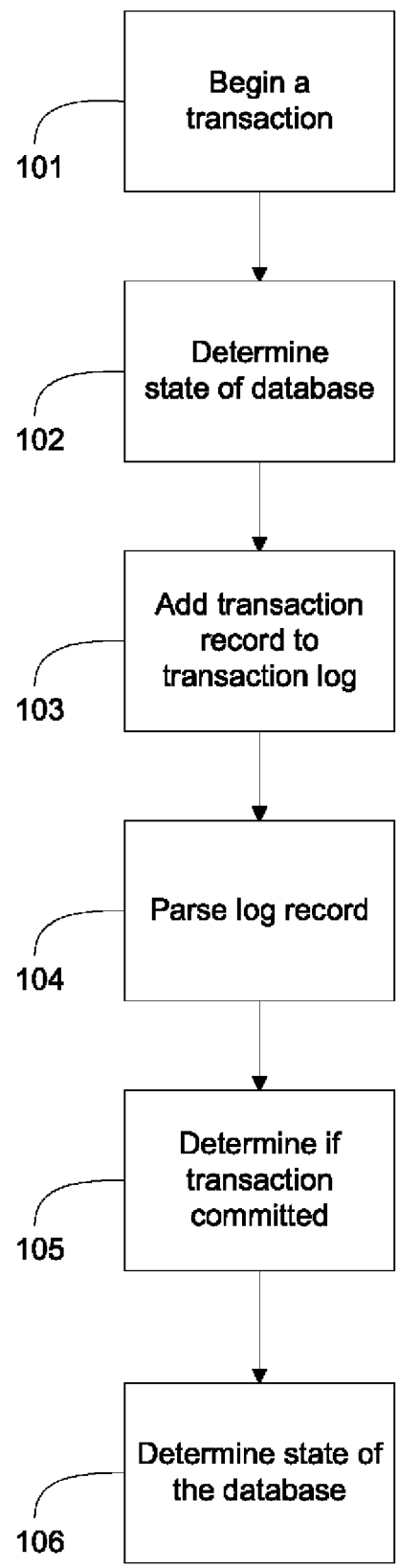
FIG. 1 is a block diagram showing an example method that a compute server can use to initiate and validate a transaction.

The detailed description provided below in connection with the appended drawings is intended to describe example embodiments and is not intended to exclusively represent the only forms in which the technology, methods and techniques described herein can be implemented or used.

Although the present examples are described and illustrated herein as being implemented in a database system, the system described is provided as an example and not a limitation. As those skilled in the art will appreciate, the technology described herein is suitable for application in a variety of different types of transactional record management systems, including without limitation database systems, version control systems, file systems, billing systems, e-commerce systems, mapping systems, and any other system which can benefit from transactional storage of records.

In accordance with one implementation described in relation to databases, a compute server starts a process of determining if a database transaction commits by appending a transaction record to a transaction log. The transactional record manager accepts such requests to append transaction records to the transaction log from a large number of compute servers, without locking the records being updated in the database transactions, and serializes the requests and places the information corresponding to transaction records in serial order into the transaction log as log records.

An updated portion of the log can then be sent (e.g., broadcast) to each of the compute servers. Each of the compute servers independently reviews the updated portion of the transaction log and determines for each log record in it whether to treat the corresponding transaction as committed or not. The determination is made based on the log record and on the transaction's relationship with other transactions recorded in the transaction log. If a compute server determines that a transaction is committed, then it uses the transaction's results (i.e., considers the results to be usable and valid). If a compute server determines that the transaction is not committed, then it ignores the transaction's results, and effectively considers the transaction as not having occurred.

Thus each compute server that accesses the shared database independently determines for itself whether the transaction committed, without performing any additional communication with other compute servers. In an embodiment the database includes a shared storage or "log-structured storage" that is treated as a sequential device, where new data are added to the end of a populated region of storage. The term "log-structured storage" indicates that the storage is treated as if it were a sequential log of pages. In an embodiment the storage's underlying technology can support random writes. In an embodiment, the database comprises the transaction log, and in an embodiment the transaction log comprises the database.

A database system can allow multiple compute servers to have direct access to shared storage, and allow multiple compute servers to run transactions that update records of the database in the shared storage. Two operations on the same data conflict if at least one of them is a write. In general the decision to commit or abort a transaction is based on the presence or absence of operations in other transactions that conflict with operations of the transaction being committed or aborted.

One way to ensure that only one compute server updates a given piece of data in shared storage is through the use of a lock manager. The lock manager can provide a mechanism to lock the data being updated. This lock can be granular, such as per-record or per-row, or in certain cases the lock can be for the entire database.

However, compute servers incur delay when setting locks in a shared lock manager. This delay limits transaction throughput. Moreover it can be difficult to detect compute servers that obtain a lock and then fail to release the lock (e.g., due to software bugs, hardware failure, or system crashes), also known as "leaked locks". It can also be difficult to recover from the failure of a lock manager that is shared by multiple compute servers, because the loss of locks can prevent all running compute servers from making progress until the lock manager recovers. Locks can also enable circular dependencies between two or more locks, resulting in deadlocks. For example, in a situation where two locks are necessary to complete an action, server one can successfully acquire lock one and then request lock two, while server two can successfully acquire lock two and request lock one. Progress will halt until the situation is detected and corrected. Attempted solutions to these problem have significant complexity, and each solution has its own pitfalls.

In systems employing lock managers, as more compute servers are added, throughput initially increases because the combined processing power of the compute servers increases. Although overall throughput increases, the number of locks taken also increases, resulting in increased lock contention. At some point, the addition of another compute server will result in that additional server having essentially no chance at all to run and must sit idle, because all the other compute servers are already setting locks on data, and at least one of those locks is a lock that the newly added compute server requires.

What is worse, this newly added single compute server is unlikely to be stopped by its very first database access. It will most likely obtain a few locks before it bumps into one of the other compute servers' locks. The locks that it does obtain then have a negative contribution to the throughput of the other compute servers.

What therefore happens is that the throughput rises as compute servers are added, but only to a certain point. At this point throughput peaks. After this point, the throughput of all the compute servers decreases significantly and continues to decrease as additional compute servers are added. This is known as lock thrashing, and significant efforts have been devoted to means of minimizing this effect.

Systems employing lock managers often partition the application, the database, or both, to overcome scalability limitations. As can be appreciated, by omitting the lock manager and enabling compute servers to determine independently whether each transaction commits, each compute server can maintain a view that includes the results of committed transactions and not the results of aborted transactions without using locks or other forms of synchronization or communication with other compute servers. Embodiments described herein can thereby scale without having to partition, and thus avoid the complexity, compromises, and drawbacks of partitioning schemes.

Thus, systems employing lock managers can have both significant complexity, and limited scalability due to an upper limit to their throughput regardless of the number of compute servers that are attached to the shared storage.

As used herein, the term "database" refers to any transactional record management system, including without limitation database systems, version control systems, file systems, billing systems, e-commerce systems, mapping systems, and any other system which benefits from transactional storage of records.

As used herein, a transaction is a unit of work performed by a transactional record manager. Transactions can include operations on records such as read, write, increment, decrement, multiply, insert, delete, and the like, which can occur across one or more records stored in a transactional record manager. The set of operations can be divided into read-only operations, which do not modify records, and update operations, which modify, add, or delete records or relationships among records.

In general with respect to databases, it can be useful or desirable to ensure that transactions are Atomic, Consistent, Isolated, and Durable where possible. These four properties together are referred to as ACID. Atomicity refers to a property wherein either all of the tasks in a transaction become visible to other transactions (i.e., the transaction is committed) or none of the tasks in the transaction become visible to other transactions (i.e., the transaction is aborted). Consistency refers to the property that the transactional record manager remains in a consistent state before and after the transaction is processed (whether the transaction is committed or not). Isolation refers to the property that other transactions cannot access or see the intermediate state of records in a transaction. Durability refers to the property that, once a transaction is determined to be committed, the transaction will persist and not be undone.

A transaction can be associated with a point-in-time state of at least a portion of the database (i.e., a "view" of at least a portion of the database) through one or more timestamps, log sequence numbers, log file offset, pointer to a log record, or the like. These timestamps and the like can be used to determine the state of the database at the time the transaction started, ended, and/or some relevant time in between to assist in determining which transactions commit.

A transaction's readset is an indication of the specific data read by a transaction. For example, if a first transaction reads a record from the database at time $t_0$, and that record is later updated by a second transaction to contain a different value at time $t_1$, the first transaction's readset includes an indication that the record was read.

In some embodiments, a transaction record can include a state (or view) of at least a portion of the database. In one embodiment, if a first transaction reads a record from the database at time $t_0$, the state can include an indication that the record contained the original value read at $t_0$. In one example, a transaction's view of the database, when coupled with the transaction's readset, enables each compute server to determine the specific values read during the transaction. In one embodiment, a transaction's view of the database can include a point-in-time view or snapshot of at least a portion of the database. In one embodiment, the view of the database can include an indication of a committed log record, and the committed log record can provide an immutable view of a state of the database as shown in FIGS. 8a-8d. In another example, the actual values of the data used by the transaction can be included with the view of the database. In still another example, a transaction's view of the database can include an indication of an earlier transaction log's log sequence number or the like.

For the purposes of simplicity in the disclosure, intervening transactions and validation will both be described relative to backwards validation unless explicitly called out otherwise. Validation is the process of determining if a transaction will commit or abort, the details of which are dependent upon the isolation level desired. Backwards validation validates a first transaction with respect to previously committed transactions.

A first transaction is an intervening transaction with respect to a second transaction if the first transaction may have committed after the start of the second transaction but before the second transaction's record is written into or otherwise becomes part of the transaction log. Thus, an intervening transaction is an earlier one of two transactions that chronologically overlaps the later transaction at least partially. For examples, see the descriptions of FIGS. 3-5 starting at paragraph [0091].

A transaction is committed or considered to be committed if the transaction has been validated against all intervening transactions. Thus, validation refers to a process of determining if a transaction commits or aborts Optimistic concurrency control divides a transaction into a read phase, a validation phase, and a writing phase. During the read phase, a transaction can read records from the database and can perform writes on copies of the records, wherein the copies of the records are private to the transaction (e.g., a transaction-local cache). During the read phase, conflict checking may be avoided altogether, instead delaying this to the validation phase. The read phase may keep an indication of the value of records read during each read to assist the validation phase. During the validation phase, a determination is made as to whether the transaction commits or aborts. During the write phase, private changes can be made global or visible to other transactions.

"Optimistic concurrency control" as used herein, does NOT require that the validation phase occur prior to the write phase. This is because, by storing at least a portion of the information within transaction records in the transaction log prior to determining if they commit, each compute server performs the validation phase independently and reaches the same conclusions for each log record. Thus, the changes are made globally visible through the log, but may still be ignored by the compute servers if the corresponding transaction in the log which contains (directly or indirectly) those changes is determined to abort.

For example, a transaction $T_{11}$ using optimistic concurrency control can be validated against an intervening transaction $T_{10}$ if one of the following conditions is satisfied:
  (1) For snapshot isolation: Transaction $T_{11}$ did not write any of the items written by $T_{10}$, and $T_{10}$ finished its write phase before $T_{11}$ began its write phase.
  (2) For serializability (minus phantom avoidance): Transaction $T_{11}$ did not read or write any items written by $T_{10}$.

An isolation level is a property that defines when or how changes made by one operation become visible to other transactions. Example isolation levels include read-committed isolation, repeatable read isolation, serializable isolation, read committed snapshot isolation, snapshot isolation, and the like.

When using optimistic concurrency control mechanisms, the determination of whether two transactions conflict depends on the isolation level in effect. When using snapshot isolation, two transactions conflict if they both write into the same data item. When using serializable isolation, two transactions conflict if one transaction reads or writes a record that the other transaction writes. When using read committed isolation, two transactions will never conflict because neither transaction will be able to modify the view of the database used by the other transaction. As can be understood, the methods disclosed herein fully support additional conflict tests for other existing or new isolation levels.

A transaction's operations that determine whether the transaction will be deemed to be committed or aborted (i.e., "commit-critical") depend upon the isolation level. For example, if optimistic concurrency control with read committed isolation and either an immutable or multi-version database structure are used, then no operations will be deemed to be commit-critical because two transactions will never conflict. Similarly, when if optimistic concurrency control with serializable isolation and an immutable database structure are used, then both read operations and update operations can be commit-critical operations because knowledge of both is required to determine if a transaction commits.

A transaction record includes information pertaining to a transaction that a compute server provides for inclusion in the transaction log. As can be appreciated, the information contained within a transaction record is highly dependent upon the isolation level. For example, a transaction record can include a transaction's view of the database and information about a transaction's commit-critical operations. In another example, a transaction record can include all updates performed by the transaction, e.g., can identify all variables that have been updated and their new values. A transaction record can further include a readset (and therefore which records were potentially relied upon) and/or an isolation level corresponding to the transaction.

In an example embodiment, a transaction log includes a serial or temporal record of modifications to a database and includes information as to which transaction performed each modification.

In one example, a transaction log is an appendable log. For example, elements can be logically appended to the log. By using a logically appendable log, transaction records can be put into an order that facilitates or enables conflict resolution.

In one example embodiment, the transaction log may be a file. Elements to be appended to the transaction log can be appended to the end of the file. In this manner, the file offset of each element can be used to logically determine the order of the elements. The elements may include the actual transaction records or pointers or references thereto.

In still another example embodiment, the transaction log can be any type of storage, where a log sequence number or similar is added and/or assigned to each transaction record, and the log sequence number defines the order of the transaction records with respect to each other.

A log manager is a device, computer, software module adapted to run within a computing device, one or more processors configured by software instructions to perform specific acts, or the like which controls access to the transaction log. A transaction log can be appendable by multiple compute servers, each attempting to append to the transaction log at substantially the same time. Thus, one important purpose of the log manager is to serialize the information within multiple transaction records into the transaction log as log records, e.g., place transaction records from multiple compute servers into the transaction log so that the log records are ordered or in a sequence in the transaction log.

In some embodiments, because the storing in the transaction log does not require pre-determination of whether the transaction committed, the log record can omit an explicit indication of whether its own transaction committed. Because the determination of whether the transaction commits or aborts cannot occur until the transaction record information is included in the transaction log, the transaction record omits an explicit indication of whether its own transaction committed. In some embodiments, each log record corresponds to a single transaction.

The log manager can further have the ability to broadcast information regarding the appended log records to all corresponding compute servers, for example some or all of the log records and/or an indication of their order within the transaction log. Although not required to be broadcast, use of broadcast, multicast, or the like can reduce the amount of data flowing over the communications channel(s) with transaction log updates.

The broadcast can be sent to all or a portion of the compute servers. In addition, the log manager can have multiple "broadcast groups", each of which can receive updates according to a different schedule. As examples, the log manager can send updates of the transaction log immediately as they occur, once per week, every 23 transactions, every 47 committed transaction (if the log manager also validates the log), according to an external stimulus (e.g., receiving a request to do so, ambient temperature variations, etc.), and/or combinations of the above. Furthermore, a single log manager can simultaneously support multiple such broadcast groups. Although described as broadcast groups, the notifications may be targeted to individual servers, multi-cast, broadcast, or the like.

The log manager can place the transaction records into the transaction log without locking the records. This can occur even when the records were updated, or otherwise would affect other transactions. In some embodiments, the log manager can place the transaction records into the transaction log without any parsing of the contents of the transaction records.

In some embodiments, the log manager can also convert a value embedded directly within the transaction record into one or more pointers to a location in shared storage when creating the log record by writing the embedded value to shared storage prior to including the log record in the transaction log. Similarly, in some embodiments, the log manager can convert a pointer to a shared storage location in a transaction record into an embedded value in the log record by reading the value from the shared storage location prior to including the log record in the transaction log.

By avoiding the locking of records that correspond to a transaction, example embodiments remove a significant throughput bottleneck and also remove significant complexity related to leaked locks, and lock contention resolution, e.g., resolving contention or demand for the same lock(s) by multiple entities.

In one example, the log manager can be any device that provides appendable storage. In another example, a second computer, compute server, device, or the like determines an indication that an update of the transaction log has occurred, and notifies compute servers that are interested in accessing a shared database corresponding to the transaction log (e.g., the corresponding compute servers) about the updates to the transaction log. One or more of the compute servers can poll the log and then broadcast the updates to one or more of the other clients.

In another example, the transaction log may be append-only storage, where the final location being written to is not known by the computing device requesting the data be appended until after the data has been appended.

A log manager can use mechanisms that increase the throughput of transaction records from multiple compute servers to the transaction log and increase the throughput of updates to all corresponding compute servers. For example, the log manager can include the ability to communicate updates to the transaction log to all corresponding compute servers, for example via the use of multicast IP packets. In addition or in the alternative, each of the compute servers can broadcast the transaction records to all corresponding compute servers interested in accessing a corresponding shared database, so long as the ordering of the transaction records is indicated or can be agreed upon.

In some embodiments, a plurality of transaction records can be written by the log manager nearly simultaneously with other transaction records being written by the log manager, without taking any locks or using other synchronization methods for data referenced within those transaction records. In some embodiments, the log manager can perform format validation prior to serializing a transaction record in the transaction log, such as ensuring that the transaction record matches an XML schema, format specification, or the like. In another example, the log manager serializes the plurality of transaction records in the transaction log without parsing the transaction records' content.

In one example, the transaction records can be placed into separate files, each of which is accessible by all compute servers interested in accessing a corresponding shared database. In this example, the transaction log contains pointers to those separate files. In yet another example, similar to the above, transaction records can be placed onto shared storage accessible by all compute servers, and the transaction log can then contain pointers to the shared storage locations, such as a networked storage identifier that identifies a shared storage and an offset into the identified storage, that specifies a location in the shared storage that contains one or more transaction records.

A log record is information pertaining to a transaction that has been written to the transaction log. In some embodiments, a log record can contain a transaction record and a log sequence number. A difference between a log record and a transaction record is that the log record has been placed into the log and thus can be ordered relative to other log records, whereas transaction records can originate and exist outside the log (e.g., within a compute server).

In some embodiments, the log record can contain a transaction record and an indication of the previous log record. Thus, the log record provides sufficient information to determine the order in which the log record occurs in relation to the other log records in the transaction log. In some embodiments, the log record can contain one or more pointers to shared storage containing some or all of the information referenced by the log record.

It is hereby noted that a transaction log as used herein, and contrary to its ordinary meaning, can contain log records which will not validate. Therefore, the transaction log generally includes both committed and non-committed (i.e., aborted) transactions.

A compute server is a computing device which enables software, other computing devices, and the like to perform read-only operations on records, for example, with respect to a database. The records accessed by the compute server are stored at least in part in shared storage. The shared storage is shared with at least one other compute server, and each of the compute servers is operably connected to a log manager. In addition, some compute servers may provide the ability to initiate transactions that include update operations.

FIG. 1 is a block diagram showing an example method that can be implemented by a compute server that initiates a transaction.

At step 101, a compute server begins a transaction. The compute server can determine a local copy of at least a portion of the transaction log. As can be appreciated, this local copy of the transaction log need not be the most up-to-date version of the transaction log as held by the log manager, nor identical to that held by other compute servers in the system. In one embodiment, the compute server requests the last log record from the log manager to determine the current state of the database. In another embodiment, the compute server uses the last log record which it has parsed as the current state of the database. In still another embodiment, the compute server uses any other log record as the current state of the database, e.g., the log record corresponding to midnight of the last Sunday, 73 log records prior to its last parsed record, or 131 committed log records prior to the most recent log record as requested from the log manager.

In one embodiment, the compute server keeps locally only the portion of the transaction log which corresponds to the records it accesses. This can enable the compute server to find the records of commonly used records more quickly than parsing the shared log. The compute server can also request to be added to, or dropped from, one or more of the log manager's broadcasts. The compute server can also request specific log records from the log manager at any time, such as to fill in a missed indication of updates (e.g., due to temporary transmission or reception problem).

At step 102, the compute server determines an indication which identifies or enables determination of a state or view of the database as used for the transaction. For example, this indication can be a last log record in a locally cached copy of the transaction log or a portion thereof. This indication can be the file offset, log sequence number, pointer to shared storage, or the like. Thus, the state or view of the database can be later communicated with the transaction record to the log manager.

The compute server may be receiving updated log records during the steps 101 and 102. If any of the updated log records is determined to indicate a committed transaction that conflicts with the current transaction, the compute server can abort the current transaction without the remaining steps because it can already determine that the addition of the transaction to the transaction log would not result in a committed transaction. In this case, the compute server can attempt to restart the transaction, without causing the remaining compute servers in the system to parse this aborted transaction.

At step 103, the compute server adds a transaction record corresponding to the transaction to the transaction log.

At step 104, the compute server parses one or more log records, at least one of which corresponds to the transaction. As can be appreciated, the log record corresponding to the transaction is now part of the transaction log as maintained by the log manager. In some implementations, the compute server has a copy of the transaction log maintained by the log manager, including log records at least through the transaction that the compute server initiated.

At step 105, the compute server independently parses at least a portion of the transaction log, in particular the portion including the log record corresponding to its transaction, to determine if its transaction committed or aborted. As can be appreciated, the portion of the transaction log to parse can depend upon the isolation level of one or more transactions in the log.

At step 106, the compute server determines an updated state of at least a portion of the database, the updated state including the result of the determination 105 whether the transaction committed or aborted. For example, if the transaction did not commit, the compute server can free or otherwise reclaim any storage used by the updated values that were modified by the transaction. In another example, if the transaction commits, the compute server can cache the updated values or results of the transaction locally for quicker access.

When multiple compute servers implement this method, the independent determination at step 105 avoids a need for a coordinated blocking protocol across all the compute servers who update data. The compute servers each independently determine the same synchronized updated state of at least a portion of the database at 106 by virtue of the fact that the compute servers all look at the same log, using the same rules of analysis, and all therefore independently come to the same conclusion as to which transactions aborted and committed.

Figure 2:
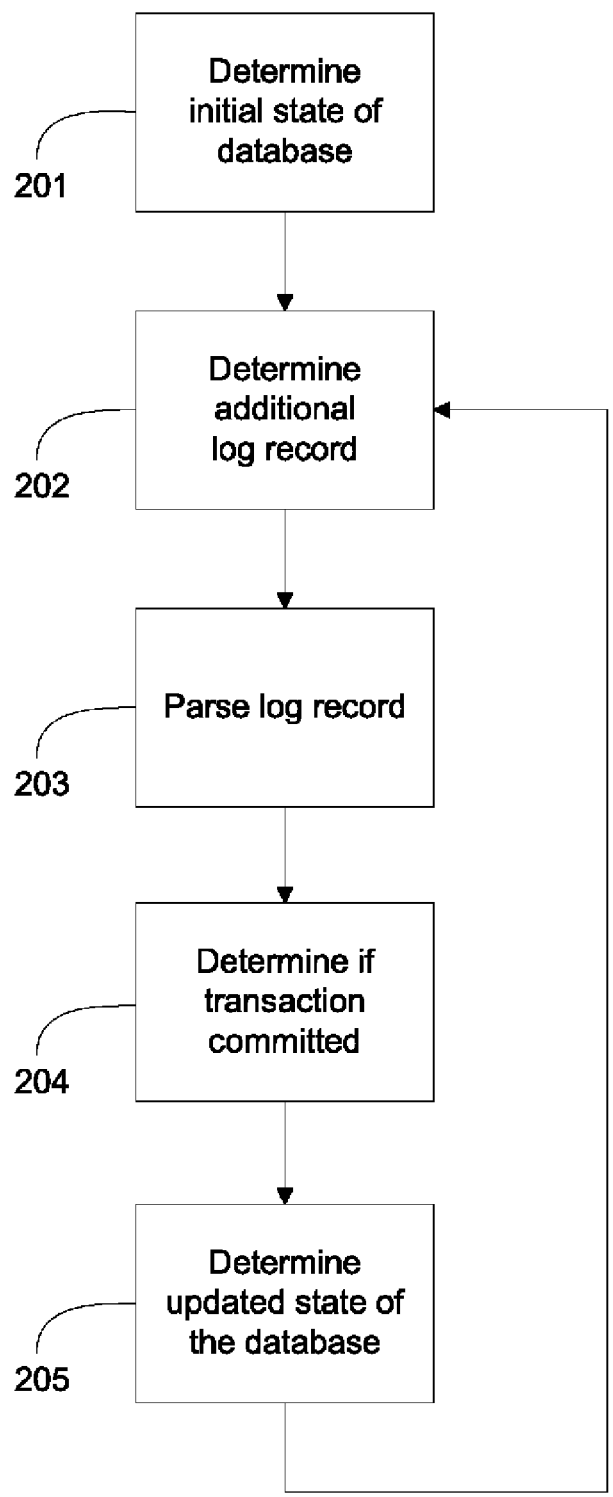
FIG. 2 is a block diagram showing an example method that can be implemented by a compute server to determine a state of a database.

FIG. 2 is a block diagram showing an example method that can be implemented by a compute server to determine a state of the database, e.g., with respect to a particular transaction. This example method can be used by both read-only compute servers and those which perform updates to the data.

At step 201, a state of at least a portion of the database is determined. For example, the compute server can do this by parsing the entire transaction log. In another example embodiment, the compute server can determine a state of the database (or of a portion of the database) by parsing a compressed representation of the entire transaction log which includes only the most recent updates to any given record. In still another example embodiment, any records in the database and not in a local cache are initialized to an "unknown" state, while records in the local cache are collectively or individually correlated to a point-in-time view of the database, such as a log sequence number.

In either case, some indication of the next log record to parse next is determined. In one example, an indication of the last log record corresponding to the initial state is determined. In another example, an indication of the log sequence number of the last parsed (or next expected) log record is determined.

At step 202, the compute server determines that one or more additional log records exists in the transaction log. For example, this can be due to the compute server receiving a message across a communications medium of the one or more additional log records, or an indication of the same, for example a periodic broadcast from the log manager. In another example embodiment, log sequence numbers are sequentially assigned, so a log sequence number included in the additional log records that is greater than the last log sequence number which the compute server has parsed allows the compute server to determine that it has not yet included the information contained within the log record in its view of the database.

At step 203, when the compute server determines that it should include those additional log records in its view of the database, it parses the one or more log records. This parsing of the one or more log records need not happen immediately. For example, a compute server can be configured to parse the log records at a set time each day, in order to provide a daily snapshot view of the database. Other periodic parsing can alternatively or additionally be used, for example once a week, once a month, once an hour, once per second, every 97 log records, every time the size of the unparsed log records exceeds 203 megabytes, and so forth.

At step 204, the compute server determines if each of the one or more transactions corresponding to the one or more additional log records committed. Because the transaction log can include log records that may not validate, some of the transactions may not have committed and may in some embodiments be discarded or otherwise ignored.

At step 205, the compute server determines an updated state of the database and accounts for effects of the updated log records. For example, the compute server can apply the operations of the committed transactions to any locally cached data or simply invalidate or delete the same locally cached data that is now obsolete.

Thus, the compute server can transform its initial view of (e.g., an initial state of) the database into an updated view of (e.g., an updated state of) the database by receiving and analyzing additional log records. Furthermore, this process can occur simultaneously on a plurality of compute servers, without synchronization between the transactions of the plurality of compute servers.

Figure 3:
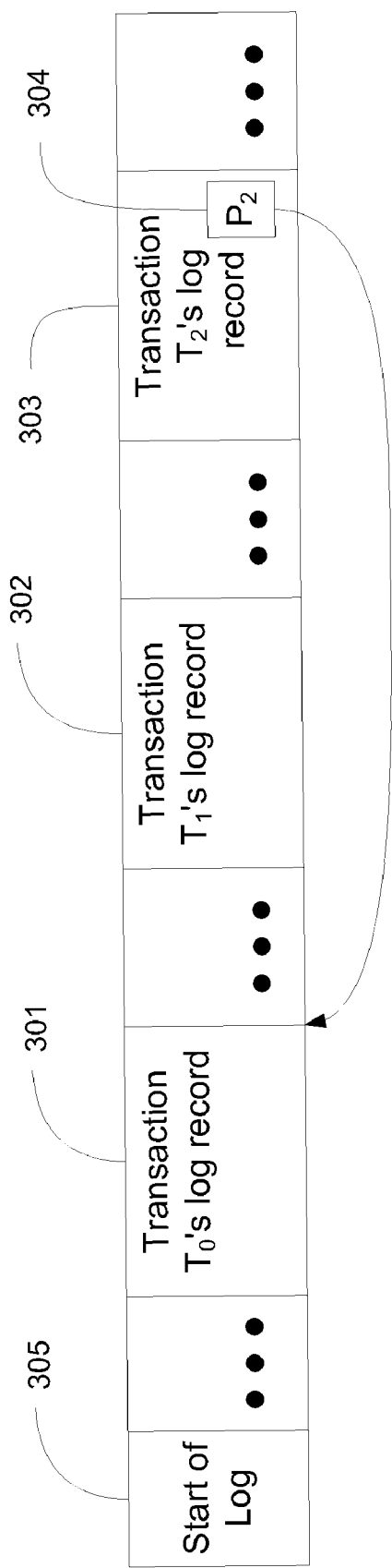
FIG. 3 is a block diagram showing an example transaction log.
Figure 4:
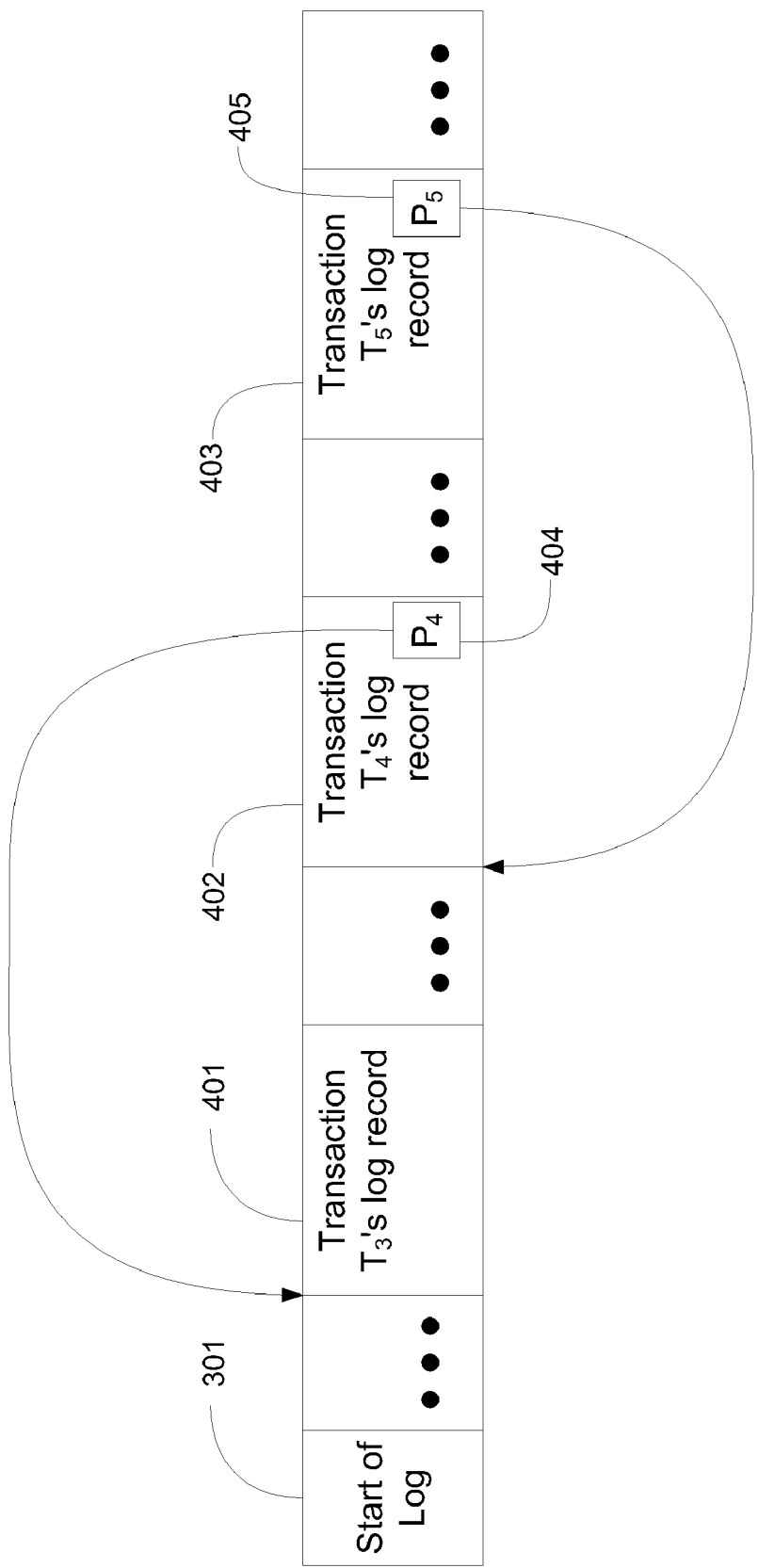
FIG. 4 is a block diagram showing an example transaction log.
Figure 5:
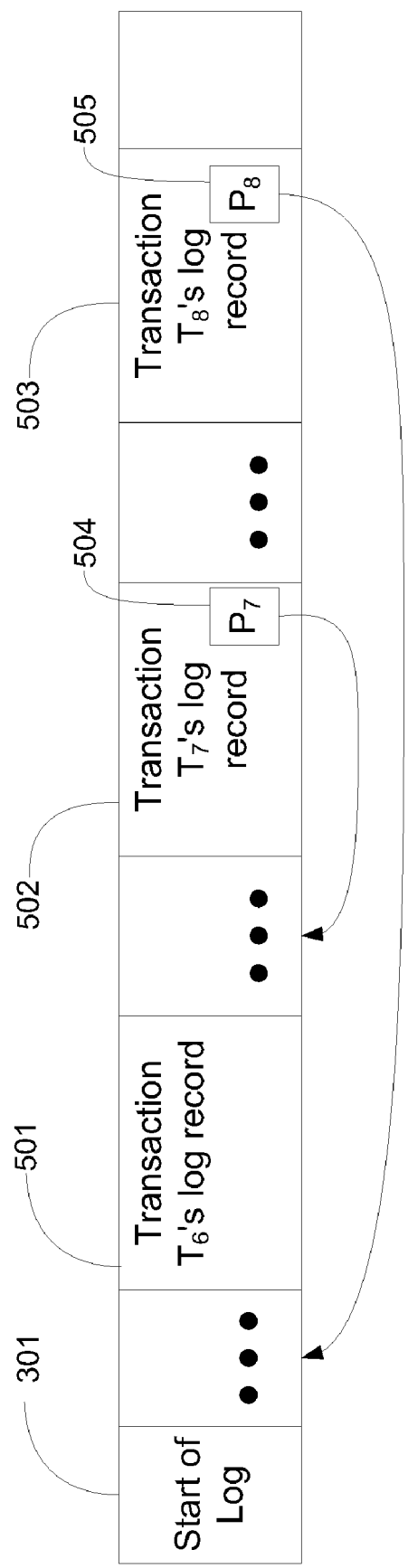
FIG. 5 is a block diagram showing an example transaction log.

FIG. 3, FIG. 4, and FIG. 5 are block diagrams showing examples of one possible implementation of a transaction log.

The transaction log can include an indication 305 of the start of the transaction log. This indication 305 can be inherent in the particular implementation. In one example embodiment, if the log manager uses a file for the transaction log, the indication 305 can be inherently understood to be file offset zero. In another example embodiment, if the log manager uses log sequence numbers, a predetermined number such as zero, 1024, or negative one (−1) may be used to indicate the start of the transaction log.

The transaction log can also include a number of log records 301, 302, 303, 401, 402, 403, 501, 502, and 503 each corresponding to one or more transactions. As shown in FIGS. 3-5, log records 301, 302, 303, 401, 402, 403, 501, 502, and 503 correspond to transactions $T_0$ through $T_8$ respectively.

In addition, a log record 303 can contain one or more indications 304 of a state of the database. As shown, indication 304 ($P_2$) logically points to the state of the transaction log up to and including log record 301. Log record 302 is therefore an intervening log record against which log record 303 must be validated.

As shown in FIG. 4, log record 402 contains an indication 404 of the state of the database immediately prior to the inclusion of log record 401. Log record 403 contains an indication 405 of the state of the database immediately prior to the inclusion of log record 402. Log record 401 is therefore an intervening log record against which log record 402 must be validated, and log record 402 is therefore an intervening log record against which log record 403 must be validated.

Log record 502 shown in FIG. 5 contains an indication 504 of the state of the database at some point between log record 501 and a point in time when its own log record 502 was included in the transaction log. Log record 503 contains an indication 505 of the state of the database at some point prior to the inclusion of log record 501 in the transaction log. Log records 501 and 502 are therefore intervening log records against which log record 503 must be validated.

Although not shown, log records 301, 302, 401, and 501 can also contain an indication of the state of the database.

Figure 6:
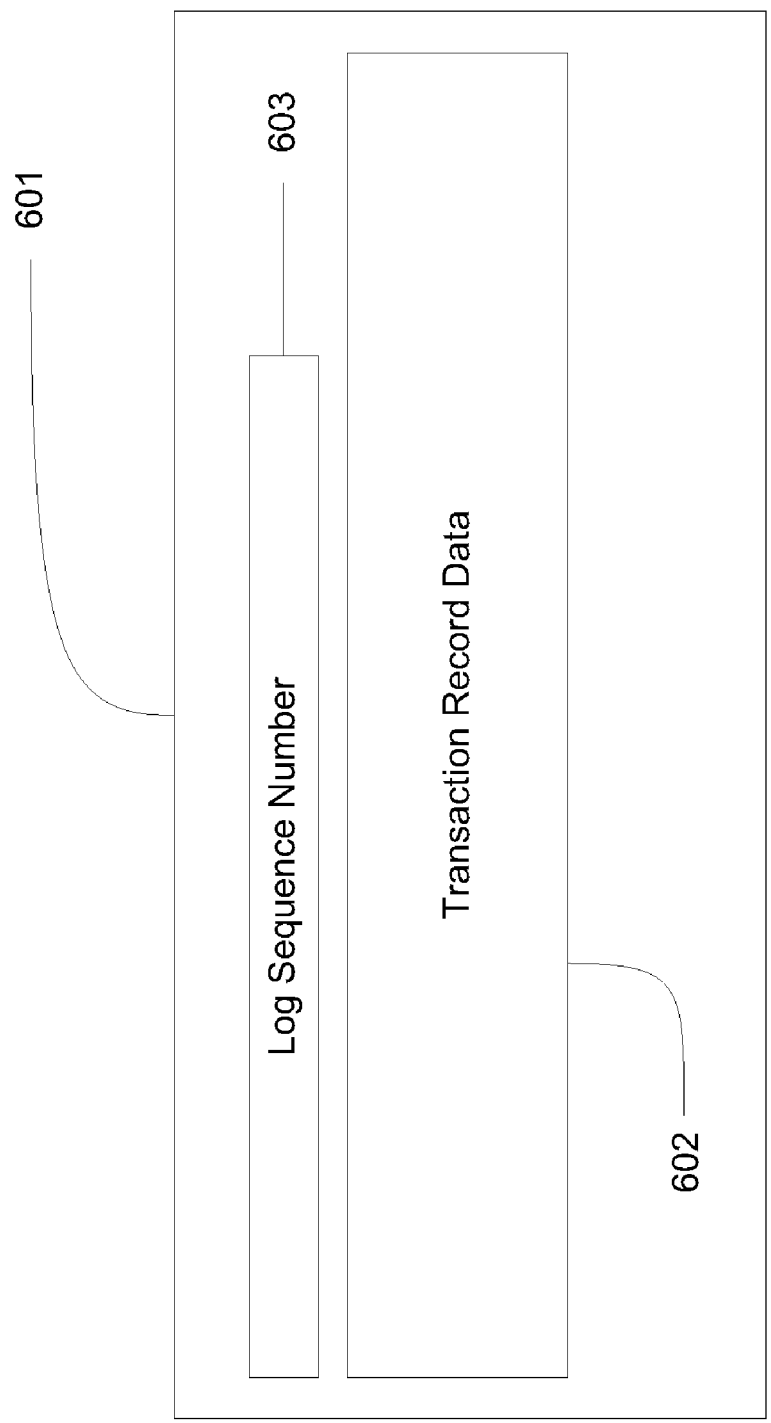
FIG. 6 is a block diagram showing an example log record.

FIG. 6 is a block diagram showing additional detail of an example of a log record. As shown, the log record 601 includes a log sequence number 603 and transaction record data 602. The transaction record data can include some or all of a transaction record, pointers to shared storage containing some or all of the data within a transaction record, indications of some or all of the data within the transaction record (such as "increment data by one", "delete the record", etc.), and/or combinations thereof. Timestamps, byte address, or other indications of sequencing information can be used in place of the log sequence number, to establish or indicate a log record's location in a sequence relative to other log records and to establish or indicate a log record's view of the database.

Figure 7:
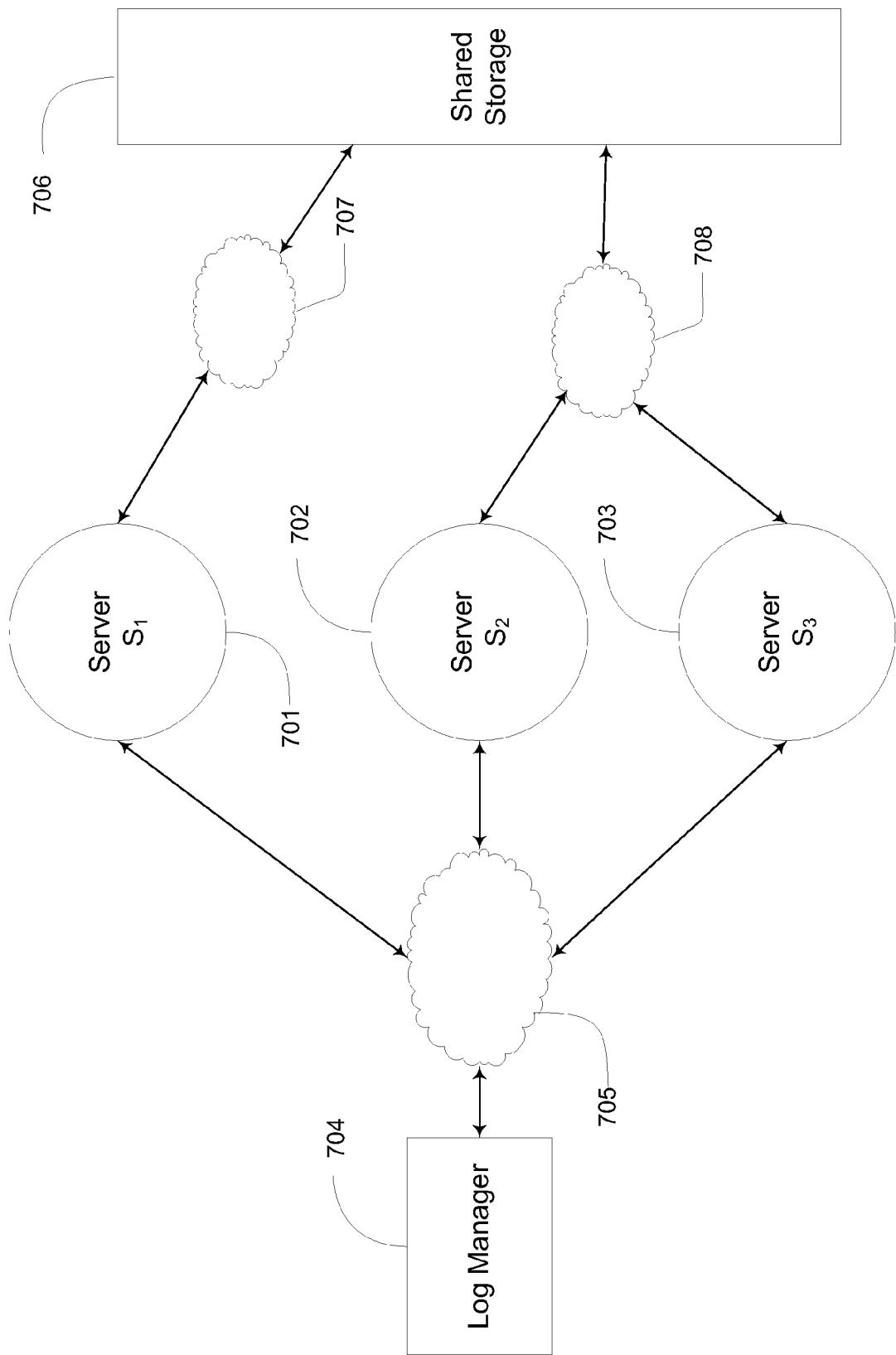
FIG. 7 is a block diagram showing an example system in which the disclosed methods can be implemented.

FIG. 7 is a block diagram showing an example system in which the disclosed technology can be implemented. Three compute servers 701, 702, and 703 are operably connected to a log manager 704 through a communications medium 705. The three compute servers 701, 702, and 703 are also operably connected through communications media 707 and 708 to shared storage 706.

The communications media 705 can be a processor interconnect, Ethernet, Infiniband, SCSI, SAS, ATAPI, SATA, USB, Bluetooth, optical fibre, PCI-E, PCI-X, AGP, cellular, near-field communication, a connection which supports TCP or UDP, peer-to-peer networking technology, wired and/or wireless mesh, and the like. Furthermore, the communications media need not be the same for each connection, and other configurations are clearly supported, and the various communications media 705, 707, and 708 can be the same or combinations of communications media.

In one implementation, the database can be stored as a balanced binary search tree. In this case, each node in the tree can be or include a <key, payload> pair. If the tree is used to store or represent a conventional relational database, the key would be a composite key and would begin with a database id and an object id. Nodes in upper levels would therefore span a set of databases. Their descendants could span sub-schemas, then tables, and eventually the key values of rows. Key storage can use prefix compression to conserve space. In another embodiment, the database can be stored as a tree of trees (e.g., representing a table of tables) to avoid having the keys logically prefixed by object ids.

The database can further be stored as a "fully persistent" structure (e.g., an immutable balanced binary search tree). Fully persistent means that all versions are retained and new versions can be based on any previous version. An immutable balanced binary search tree cannot have a node updated in place. To modify a node n of an immutable balanced binary search tree, it is necessary to create a new copy n' of n and redirect the parent of n to point to n'. Since the pointer in the parent p of n has been modified, a new copy p' of p is needed. As so on, up the tree, until a new root node has been created.

The database can be stored as a hash table, flat array, or any other logical arrangement, or immutable variations thereof.

Figure 8A:
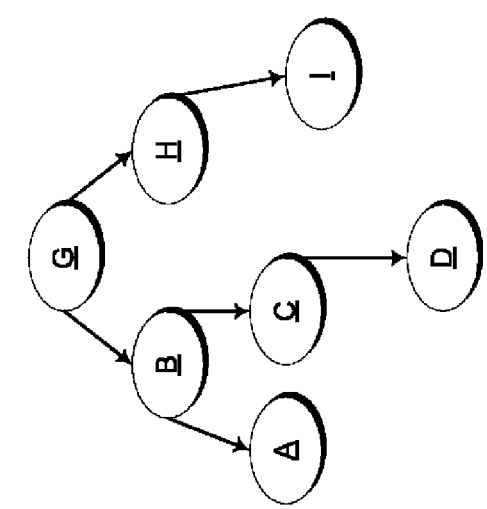
FIG. 8a is an example of a logical layout of an immutable binary tree, created by a single transaction.
Figure 8B:
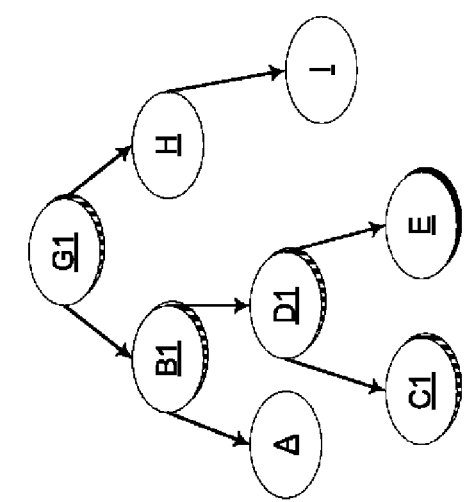
FIG. 8b is a logical layout of the immutable binary tree of FIG. 8a, with a new node added and the tree rebalanced.
Figure 8C:
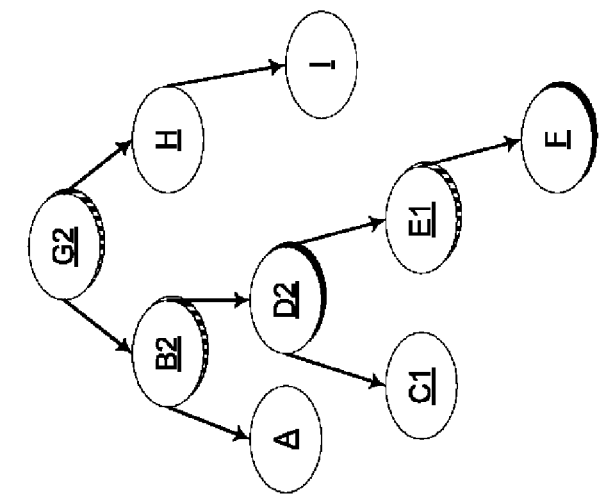
FIG. 8c is a logical layout of the immutable binary tree of FIG. 8a, with a new node added and a node modified.

FIGS. 8a-8c use the following shadow nomenclature to assist the reader in understanding the diagrams. A solid shadow (as for example with respect to all nodes of FIG. 8a) indicates that the node is either newly created or has had data changed by the transaction (and can have also had its pointers to other records updated). A vertically lined shadow (as for example with respect to nodes B1, C1, D1, and G1 of FIG. 8b) indicates that the corresponding node has only had its pointers to other records updated by the transaction. A lack of shadow (e.g., with respect to nodes A, H, and I in FIG. 8b) indicates that the node is unchanged.

FIG. 8a shows an example logical layout of an immutable balanced binary search tree created in one transaction. As can be seen, the root node G refers to nodes B and H, node B refers to nodes A and C, node H refers to node 1, and node C refers to node D. All of the nodes are newly created by the transaction, which is designated by the solid shadow.

FIG. 8b shows an example implementation of the tree of FIG. 8a with new node E added and the tree rebalanced. Node E is newly added, as designated by the solid shadow. Node C1 is created as a copy of node C due to the rebalance with no pointers to child nodes. Node D1 is a copy of node D with the pointers redirected to point to nodes C1 and E. Node B1 is a copy of node B with the pointer to node C redirected to point to node D1. Node G1 is a copy of node G with the pointer to node B redirected to point to node B1.

FIG. 8c shows an example implementation of the tree of FIG. 8b with node H read, node F added, and node D1 modified (as D2), but rebalancing deferred to another transaction. Node F is newly added. Node E1 is a copy of node E with a pointer to node F added. Node D2 is a modification of the data in node D1 with the pointer to node E redirected to node E1. Node B2 is a copy of node B1 with the pointer to node D1 redirected to node D2. Node G2 is a copy of node G1 with the pointer to node B1 redirected to node B2.

Figure 8D:
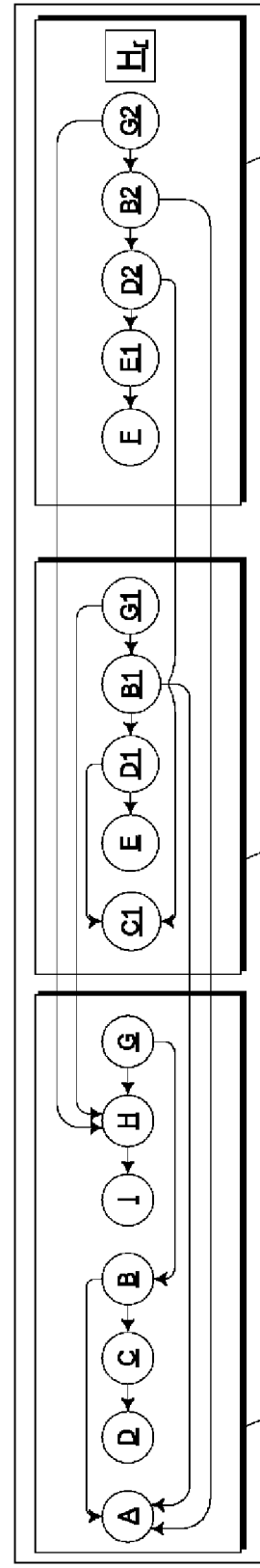
FIG. 8d is an example set of log records corresponding to the transactions of FIGS. 8a-d.

FIG. 8d shows an example implementation of a portion of a transaction log 800, corresponding to the transactions described and shown by FIG. 8a-8c. The transaction log 800 contains a plurality of log records 801, 802, and 803, an indication of reading a node $H_r$, and a plurality of nodes A, B, C, D, E, F, G, H, I, B1, C1, D1, E1, B2, D2, and G2.

Log records 801, 802, and 803 contain the updated and new nodes. Each node can contain an indication that its content was modified, that only its pointer to one or both children was modified, or that it was only read (which is needed for high degrees of isolation).

The transaction log 800 includes a first log record 801 corresponding to the transaction as shown and described by FIG. 8a. The first log record 801 indicates that each of nodes A, B, C, D, G, H, and I were modified (created) and indicates the relationships between the nodes.

The transaction log 800 includes a second log record 802 corresponding to the transaction as shown and described by FIG. 8b. The second log record 802 indicates that node E was modified (created) and that nodes B1, C1, D1, and G1 only had the pointers to child nodes modified.

The transaction log 800 includes a third log record 803 corresponding to the transaction as shown and described by FIG. 8c. The third log record indicates that node F was modified (created), that node D2 had its contents modified, that node H was read, and that nodes E1, B2, and G2 only had the pointers to child nodes modified.

Because each of the transactions shown in FIGS. 8a-8c performed updates to either the data within a node (e.g., a record) or to a node's pointers to its child nodes, each of the transactions also wrote a new root node.

In one implementation, the system uses a shared transaction log which contains the after-images of nodes updated by each transaction. These nodes within the log need not be stored elsewhere, so essentially the log can contain a major portion of the database. Other parts of the database can be included in the transaction log by reference. This can be done, for example, if the data size of the updated records exceeds some threshold, if the depth of the tree exceeds some value, etc.

In one embodiment, the size each log record is kept to a maximum size, e.g., 4 kilobytes, to match a size which is an efficient size for writing to underlying storage devices. In another embodiment, the maximum preferred size of each log record may be correlated to a maximum transmission size, e.g., the size of the user data or payload portion of one Ethernet frame. In some embodiments, the log record may include only a pointer to shared storage, e.g., a network address and storage device offset, logical block address, or the like, and the shared storage location pointed to would include one or more transaction records and correlated log sequence numbers. In some embodiments, the log record may, in order of priority, fill a preferred maximum sized log with (1) nodes whose associated record data was updated by the transaction, (2) updates to tree structures, indexes, or the like, and (3) changed data records.

In each of these embodiments, the portions of the transaction not included directly in the log can be written to shared storage, and pointers to those updates in shared storage can be included in the transaction log.

Figure 9:
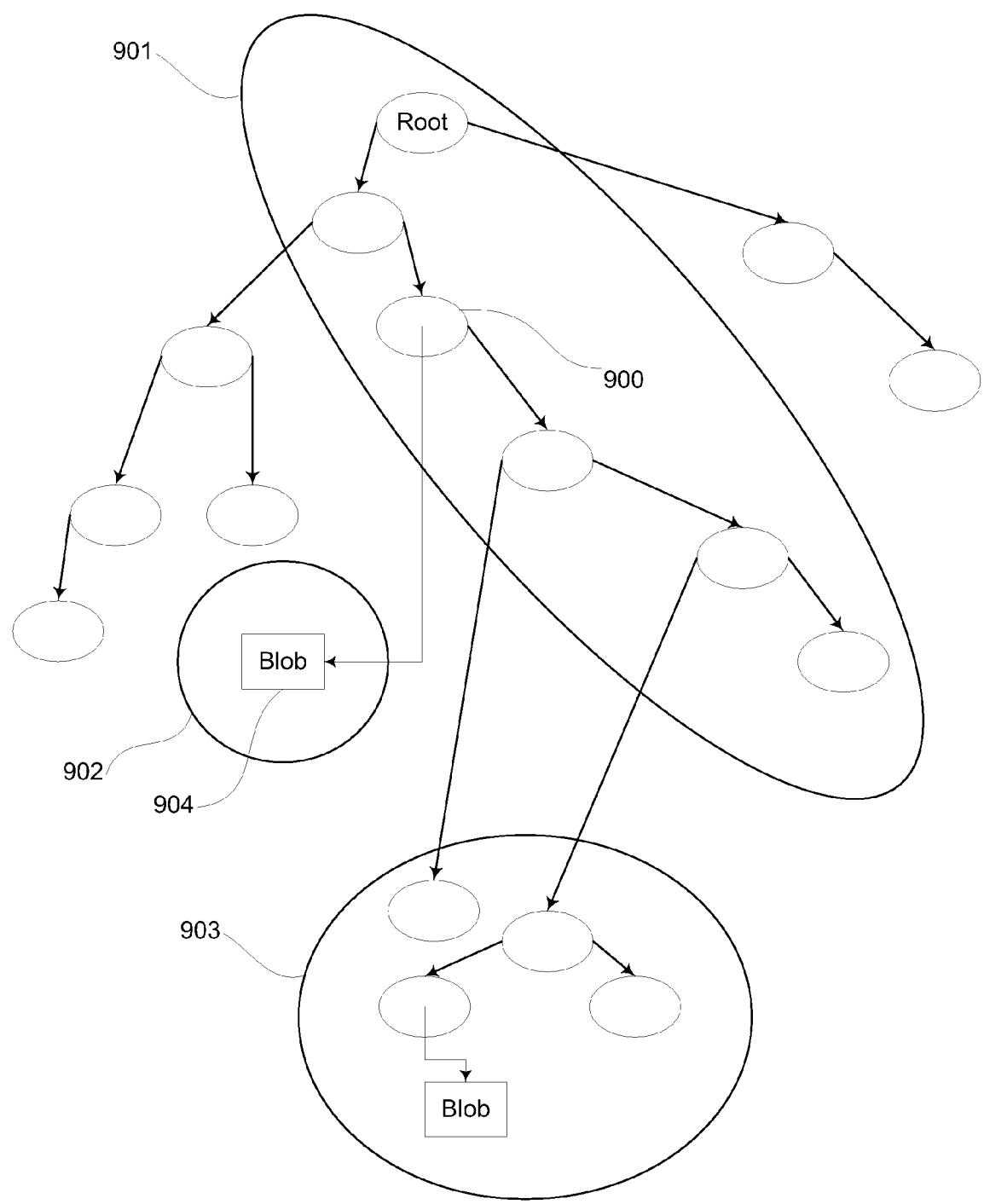
FIG. 9 is a logical layout of the changes caused by writing an example immutable binary tree, with portions of the data not included in the transaction log.

FIG. 9 shows an example of writing an immutable binary tree. As shown, a portion of the tree 901 exists directly in the transaction log. A node 900 references a data blob 904 not included in the transaction log. The data blob 904 was written to a shared storage location indicated by 902. In addition, other nodes and a data blob have been written to another shared storage location 903.

In one example embodiment, the system can use a form of snapshot isolation with optimistic concurrency control. During the read phase the compute server retains a pointer to the root node of the most recently determined database state at the time of the transaction's first commit-critical operation. When using an immutable binary tree, this pointer to the root node enables a snapshot view of the database, and the snapshot view is unaffected by update or commit operations by other transactions that execute while the transaction is running. If the transaction updates the database, the compute server writes the updated values in a location which is private to the transaction. Although private to the transaction, the updates can be stored in shared storage.

In the write phase, the compute server appends the transaction record (including the private value or a reference to the value written to shared storage) to the transaction log by sending it to the log manager.

In the validation phase, the compute server then validates the log record corresponding to the transaction that was stored in the transaction log to determine if it committed. Thus, this example embodiment supports snapshot isolation without any synchronization communication between multiple servers.

Serializable isolation, whose commit-critical operations include the transaction's read operations, can also be supported by including the transaction's read operations (read-set) into the transaction record. In some embodiments, the values read by the transaction's read operations may also be included in the transaction record.

Figure 10:
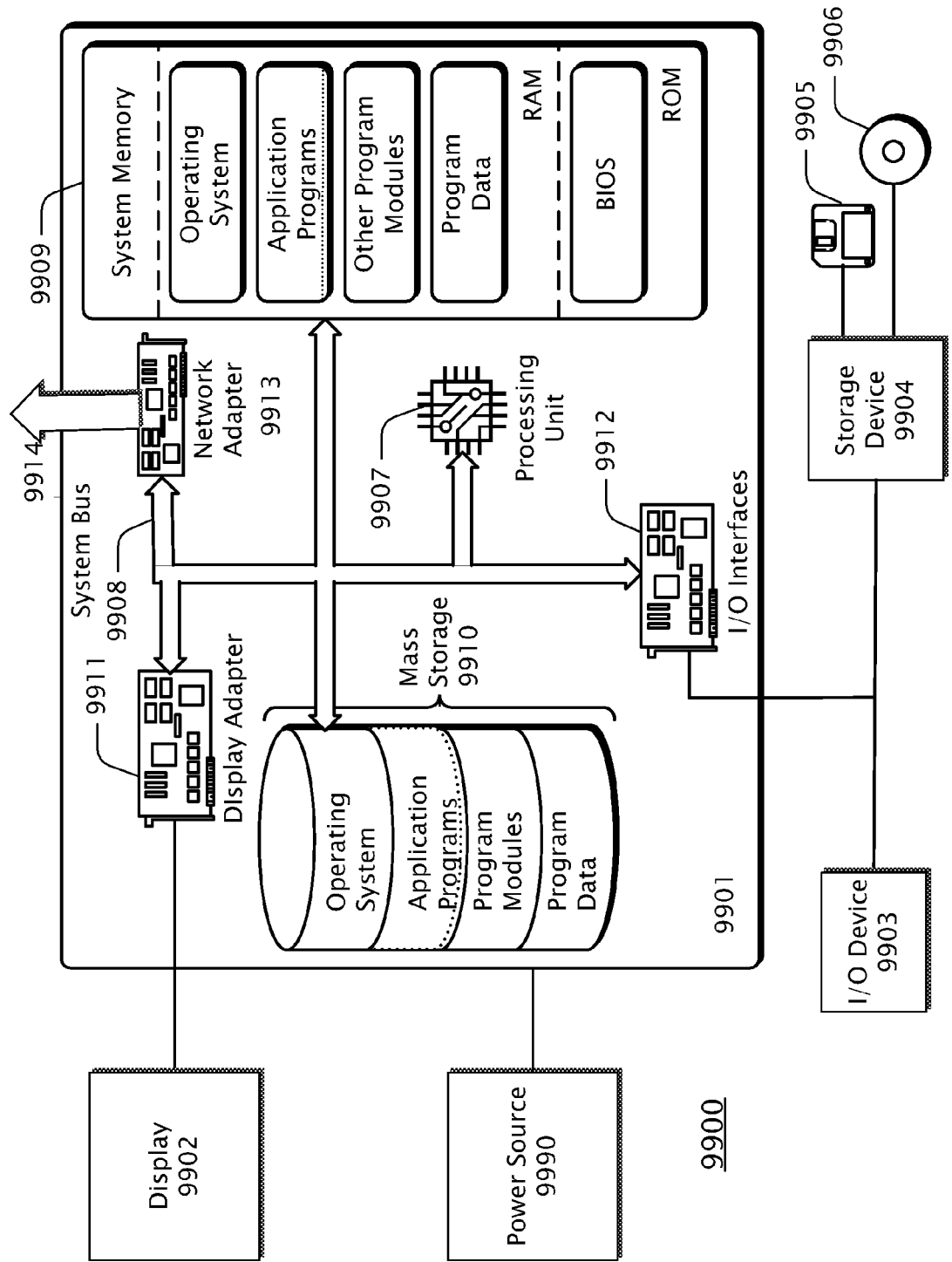
FIG. 10 is a block diagram showing an example computing environment.

FIG. 10 is a block diagram showing an example computing environment 9900 in which the technologies described herein can be implemented. A suitable computing environment can be implemented with numerous general purpose or special purpose systems. Examples of well known systems can include, but are not limited to, cell phones, personal digital assistants ("PDA"), personal computers ("PC"), hand-held or laptop devices, microprocessor-based systems, multiprocessor systems, servers, workstations, consumer electronic devices, set-top boxes, and the like.

Computing environment 9900 typically includes a general-purpose computing system in the form of a computing device 9901 coupled to various components, such as peripheral devices 9902, 9903, 9904 and the like. System 9900 can couple to various other components, such as input devices 9903, including voice recognition, touch pads, buttons, keyboards and/or pointing devices, such as a mouse or trackball, via one or more input/output ("I/O") interfaces 9912. The components of computing device 9901 can include one or more processors (including central processing units ("CPU"), graphics processing units ("GPU"), microprocessors ("µP"), and the like) 9907, system memory 9909, and a system bus 9908 that typically couples the various components. Processor 9907 typically processes or executes various computer-executable instructions to control the operation of computing device 9901 and to communicate with other electronic and/or computing devices, systems or environment (not shown) via various communications connections such as a network connection 9914 or the like. System bus 9908 represents any number of several types of bus structures, including a memory bus or memory controller, a peripheral bus, a serial bus, an accelerated graphics port, a processor or local bus using any of a variety of bus architectures, and the like.

System memory 9909 can include computer readable media in the form of volatile memory, such as random access memory ("RAM"), non-uniform memory architecture RAM ("NUMA RAM"), and/or non-volatile memory, such as read only memory ("ROM") or flash memory ("FLASH"). A basic input/output system ("BIOS") can be stored in non-volatile memory or the like. System memory 9909 typically stores data, computer-executable instructions and/or program modules comprising computer-executable instructions that are immediately accessible to and/or presently operated on by one or more of the processors 9907.

Mass storage devices 9904 and 9910 can be coupled to computing device 9901 or incorporated into computing device 9901 via coupling to the system bus. Such mass storage devices 9904 and 9910 can include non-volatile RAM, a magnetic disk drive which reads from and/or writes to a removable, non-volatile magnetic disk (e.g., a "floppy disk") 9905, and/or an optical disk drive that reads from and/or writes to a non-volatile optical disk such as a CD ROM, DVD ROM 9906. Alternatively, a mass storage device, such as hard disk 9910, can include non-removable storage medium. Other mass storage devices can include memory cards, memory sticks, tape storage devices, and the like.

Any number of computer programs, files, data structures, and the like can be stored in mass storage 9910, other storage devices 9904, 9905, 9906, and system memory 9909 (typically limited by available space) including, by way of example and not limitation, operating systems, application programs, data files, directory structures, computer-executable instructions, and the like.

Output components or devices, such as display device 9902, can be coupled to computing device 9901, typically via an interface such as a display adapter 9911. Output device 9902 can be a liquid crystal display ("LCD"). Other example output devices can include printers, audio outputs, voice outputs, cathode ray tube ("CRT") displays, tactile devices or other sensory output mechanisms, or the like. Output devices can enable computing device 9901 to interact with human operators or other machines, systems, computing environments, or the like. A user can interface with computing environment 9900 via any number of different I/O devices 9903 such as a touch pad, buttons, keyboard, mouse, joystick, game pad, data port, and the like. These and other I/O devices can be coupled to processor 9907 via I/O interfaces 9912 which can be coupled to system bus 9908, and/or can be coupled by other interfaces and bus structures, such as a parallel port, game port, universal serial bus ("USB"), fire wire, infrared ("IR") port, and the like.

Computing device 9901 can operate in a networked environment via communications connections to one or more remote computing devices through one or more cellular networks, wireless networks, local area networks ("LAN"), wide area networks ("WAN"), storage area networks ("SAN"), the Internet, radio links, optical links and the like. Computing device 9901 can be coupled to a network via network adapter 9913 or the like, or, alternatively, via a modem, digital subscriber line ("DSL") link, integrated services digital network ("ISDN") link, Internet link, wireless link, or the like.

Communications connection 9914, such as a network connection, typically provides a coupling to communications media, such as a network. Communications media typically provide computer-readable and computer-executable instructions, data structures, files, program modules and other data using a modulated data signal, such as a carrier wave or other transport mechanism. The term "modulated data signal" typically means a signal that has one or more of its characteristics set or changed in such a manner as to encode information in the signal. By way of example, and not limitation, communications media can include wired media, such as a wired network or direct-wired connection or the like, and wireless media, such as acoustic, radio frequency, infrared, or other wireless communications mechanisms.

Power source 9990, such as a battery or a power supply, typically provides power for portions or all of computing environment 9900. In the case of the computing environment 9900 being a mobile device or portable device or the like, power source 9990 can be a battery. Alternatively, in the case computing environment 9900 is a desktop computer or server or the like, power source 9990 can be a power supply designed to connect to an alternating current ("AC") source, such as via a wall outlet.

Some devices can not include many of the components shown in the drawing of the computing environment 9900. For example, in the case computing environment 9900 is a headless server or the like, a display adapter 9911 and a display 9902 can not be included.

Those skilled in the art will realize that storage devices utilized to provide computer-readable and computer-executable instructions and data can be distributed over a network. For example, a remote computer or storage device can store computer-readable and computer-executable instructions in the form of software applications and data. A local computer can access the remote computer or storage device via the network and download part or all of a software application or data and can execute any computer-executable instructions. Alternatively, the local computer can download pieces of the software or data as needed, or distributively process the software by executing some of the instructions at the local computer and some at remote computers and/or devices.

Those skilled in the art will also realize that, by utilizing conventional techniques, all or portions of the software's computer-executable instructions can be carried out by a dedicated electronic circuit such as a digital signal processor ("DSP"), programmable logic array ("PLA"), discrete circuits, and the like. The term "electronic apparatus" can include computing devices or consumer electronic devices comprising any software, firmware or the like, or electronic devices or circuits comprising no software, firmware or the like.

The term "firmware" typically refers to executable instructions, code, data, applications, programs, or the like maintained in an electronic device such as a ROM. The term "software" generally refers to executable instructions, code, data, applications, programs, or the like maintained in or on any form of computer-readable media. The term "computer-readable media" typically refers to system memory, storage devices and their associated media, and the like.

In view of the many possible embodiments to which the principles of the present invention and the forgoing examples can be applied, it should be recognized that the examples described herein are meant to be illustrative only and should not be taken as limiting the scope of the present invention. Therefore, the invention as described herein contemplates all such embodiments as can come within the scope of the following claims and any equivalents thereto.

The following claims do not cover a process performed entirely by acts of a human being without use of any machine or physical transformation.

The invention claimed is:

1. A transactional record manager system, comprising:
   a plurality of compute servers, each of the plurality of compute servers configured to perform a first method;
   a transaction log, the transaction log corresponding to a first database of at least one database, the transaction log shared by the plurality of compute servers, the transaction log containing both committed and aborted transactions; and
   a log manager, the log manager operably connected to the shared transaction log, the log manager operably connected to each of the plurality of compute servers, the log manager configured to perform a second method,
   the second method comprising:
      receiving a first transaction record from a first compute server of the plurality of compute servers,
      the first transaction record including a first indicium corresponding to a first transaction's view of at least a portion of a database and a second indicium corresponding to the first transaction's update operations; and
      appending a first log record to the transaction log, the transaction log being appended by the plurality of compute servers simultaneously without synchronization between the plurality of compute servers,
      the first log record including a third indicium corresponding to the first transaction's view of at least a portion of a database, a fourth indicium corresponding to the first transaction's operations, and a fifth indicium of sequence; and
   wherein the first method comprises:
      parsing the first log record, the first log record included in the transaction log,
      validating the first log record against at least a portion of the transaction log, the first log record being validated by each of the plurality of compute servers independently and asynchronously;
      determining whether the first transaction commits, based at least in part on the parsing the first log record and the validating the first log record; and
      determining an updated view of at least a portion of the first database based at least in part upon the determining whether the first transaction commits.

2. A method comprising:
   parsing a first log record corresponding to a first transaction,
      the first log record included in a transaction log corresponding to a first database of at least one database, the transaction log being appended simultaneously by a plurality of compute servers without synchronized communication between the plurality of compute servers,
      the first log record including a third indicium corresponding to the first transaction's view of at least a portion of the database and a fourth indicium corresponding to the first transaction's update operations,
      the transaction log shared by the plurality of compute servers, the transaction log containing both committed and aborted transactions;
   validating the first log record against at least a portion of the transaction log, the first log record being validated by each of the plurality of compute servers asynchronously;
   determining whether the first transaction committed, based at least in part on the parsing the first log record and the validating the first log record; and
   determining an updated view of at least a portion of the first database based at least in part upon the determining whether the first transaction committed;
   wherein the above steps are performed by a compute server comprising a processor.

3. The method of claim 2 further comprising additional steps performed prior to the parsing the first log record, the additional steps comprising:
   performing the first transaction's update operations; and
   sending a first transaction record to a log manager, the first transaction record including a first indicium corresponding to the first transaction's view of at least a portion of the database and a second indicium corresponding to the first transaction's update operations.

4. The method of claim 3, further comprising:
   parsing a second log record corresponding to a second transaction, the second log record included in the transaction log, the second log record including a fifth indicium of the second transaction's view of at least a portion of the database and a sixth indicium of the second transaction's operations;
   determining the second transaction is a committed intervening transaction relative to the first transaction, based at least in part on the parsing of the second log record; and
   validating the first transaction record against the second log record prior to sending the first transaction record to the log manager.

5. The method of claim 4 further comprising:
   determining a readset for the first transaction, the first transaction record further comprising a seventh indicium of the first transaction's readset, the first log record further comprising an eighth indicium of the first transaction's readset, the second log record further comprising a ninth indicium of the second transaction's readset.

6. The method of claim 3, wherein:
   performing the first transaction's update operations includes storing an updated value of a first shared data item to a private cache,
   the second indicium of the first transaction's update operations in the first transaction record includes the updated value of the first shared data item, and
   the fourth indicium of the first transaction's update operations in the first log record includes the updated value of the first shared data item.

7. The method of claim 3, wherein:
   performing the first transaction's operations includes storing an updated value of a first shared data item to a location in shared storage, the second indicium of the first transaction's update operations in the first transaction record includes an indicium of the location in shared storage of the updated value of the first shared data item, and the fourth indicium of the first transaction's update operations in the first log record includes the updated value of the first shared data item.

8. The method of claim 2, wherein the first log record omits an explicit indication of whether the first transaction aborted or committed.

9. The method of claim 2, wherein the determination of whether each transaction commits is based at least in part upon an isolation level determined by a conflict relation.

10. The method of claim 2, wherein the determining whether the first transaction committed is made using optimistic concurrency control, the optimistic concurrency control including a writing phase, and a validating phase, the validating phase occurring after the writing phase.

11. The method of claim 2 further comprising:
parsing a second log record corresponding to a second transaction, the second log record included in the transaction log, the second log record including an indicium of the second log record's view of at least a portion of the database, the second log record's view not including results of the first transaction's update operations;
determining the first transaction is a committed intervening transaction relative to the second transaction, based at least in part on the parsing of the first log record and the parsing the second log record; and
determining the second transaction is an aborted transaction based at least in part on determining a conflict between the second transaction and the first transaction, the determining the updated view of at least a portion of the database is further based at least in part upon the determination that the second transaction aborts.

12. The method of claim 2, wherein the steps of parsing the first log record, validating the first log record, determining whether the first transaction committed, and determining an updated view of at least a portion of the database are independently and duplicatively performed by each of a plurality of compute servers having access to the shared storage, each of the plurality of compute servers independently reaching the same determination whether the first transaction committed.

13. One or more computer readable storage media containing computer readable instructions that, when executed on one or more processors, configure the one or more processors to implement the method of claim 2.

14. A method of updating a transaction log comprising:
receiving a first transaction record corresponding to a first transaction from a first compute server of a plurality of compute servers, the first transaction record including a first indicium corresponding to the first transaction's view of at least a portion of a database and a second indicium corresponding to the first transaction's update operations;
appending a first log record to the transaction log, the transaction log being appended by the plurality of compute servers simultaneously without synchronization between the plurality of compute servers, the first log record including a third indicium corresponding to the first transaction's view of at least a portion of the database and a fourth indicium corresponding to the first transaction's update operations, and a fifth indicium of sequence;
determining whether the first transaction committed, based at least in part on parsing the first log record and validating the first log record, the first log record being validated by at least two of the plurality of compute servers independently and asynchronously;
determining an updated view of at least a portion of the database based at least in part upon determination of whether the first transaction committed; and
sending the first log record to at least one of a plurality of computing devices.

15. The method of claim 14, wherein the first log record omits an explicit indication of whether the first transaction aborted or committed.

16. The method of claim 14, wherein the first indicium in the first transaction record corresponding to the first transaction's view of at least a portion of the database includes an indicium of a second log record.

17. The method of claim 14, further comprising:
writing an updated record to a location in shared storage, wherein the second indicium in the first transaction record corresponding to the first transaction's operations includes an updated record, the fourth indicium in the first log record corresponding to the first transaction's operations includes an indicium corresponding to the location in shared storage.

18. The method of claim 14, further comprising:
reading an updated record from a location in shared storage, wherein the second indicium in the first transaction record corresponding to the first transaction's operations includes an indicium corresponding to the location in shared storage of the updated record, the fourth indicium in the first log record corresponding to the first transaction's operations includes the updated record.

19. The method of claim 14, wherein the transaction log is a file, and the fifth indicium of sequence is the byte offset of the log record within the file.

20. One or more computer readable storage medium containing computer readable instructions that, when executed on one or more processors, configure the one or more processors to implement the method of claim 14.

* * * * *